L. V. LANDGREEN
SPRING WHEEL FOR VEHICLES.
APPLICATION FILED JUNE 16, 1919.
1,326,458. Patented Dec. 30, 1919.
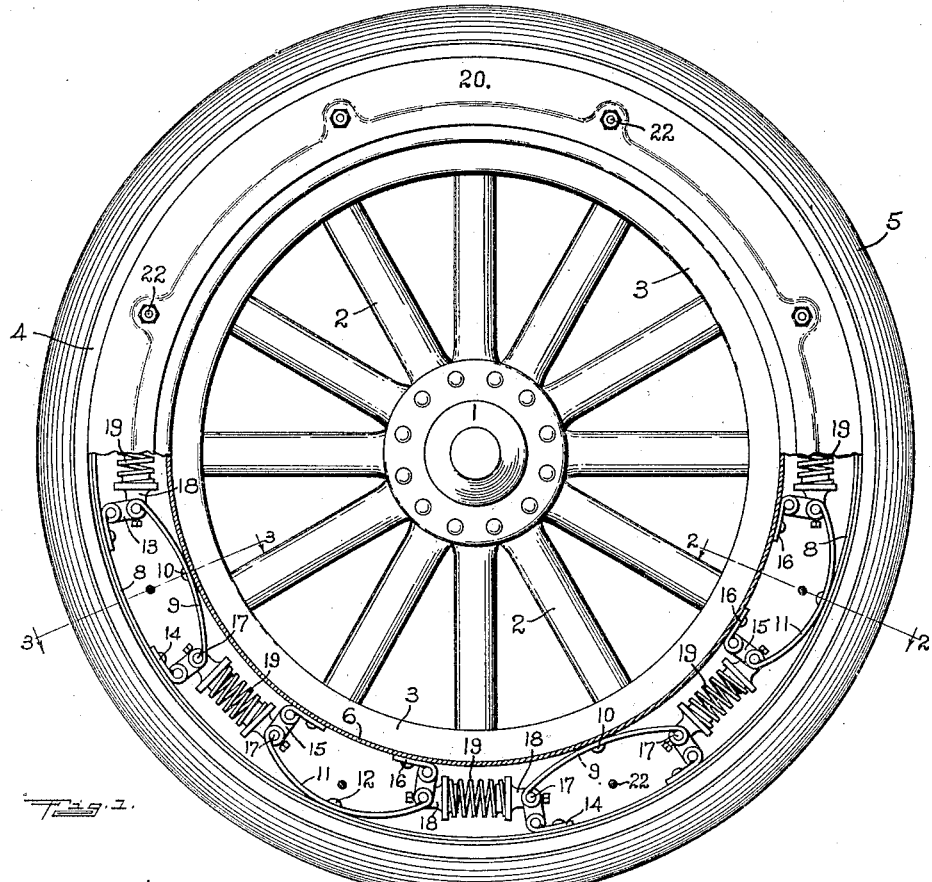
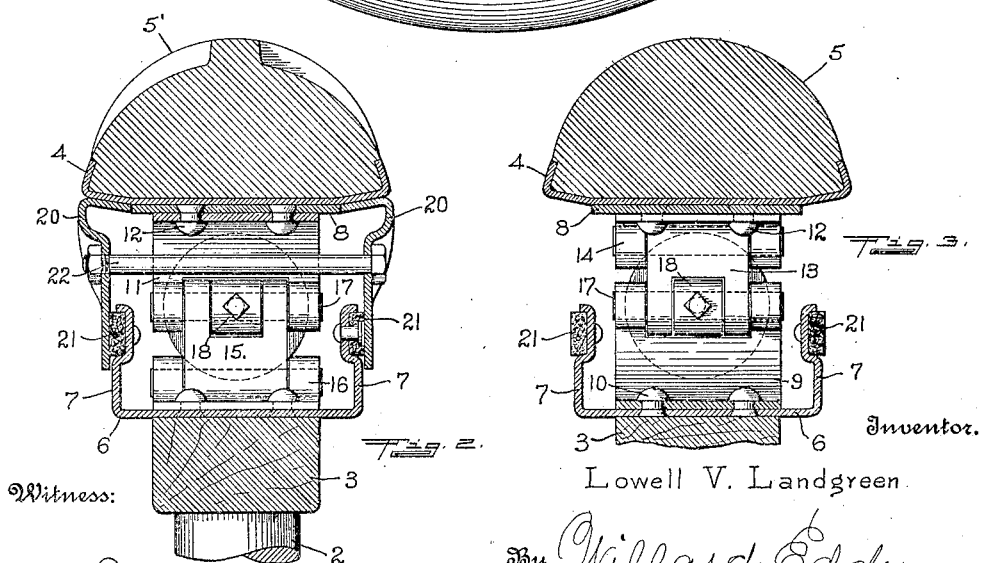
Inventor.
Lowell V. Landgreen

UNITED STATES PATENT OFFICE.

LOWELL V. LANDGREEN, OF WILSONVILLE, NEBRASKA.

SPRING-WHEEL FOR VEHICLES.

1,326,458.  Specification of Letters Patent.  Patented Dec. 30, 1919.

Application filed June 16, 1919. Serial No. 304,609.

*To all whom it may concern:*

Be it known that I, LOWELL V. LANDGREEN, a citizen of the United States, residing in Wilsonville, in the county of Furnas and State of Nebraska, have invented certain new and useful Improvements in Spring-Wheels for Vehicles, and have described the same in the following specification, illustrated by the accompanying drawings.

My invention relates to resilient wheels which belong to the running-gear of automobiles and other wheeled vehicles, and which individually comprise a system of yielding members between the hub and the rim of the wheel. It is the main object of the invention to provide in wheels of this class a satisfactory substitute for pneumatic tires. To accomplish this result, I incorporate in my improved wheel, as parts thereof, two normally concentric rims, one within the other, and an endless chain of springs, of special construction and arrangement, spacing the rims, and urging them to maintain constantly their mutually concentric position, as well as to return to that position continually when forced therefrom.

In said drawings, illustrating the best manner in which I have contemplated applying the principles of the invention, Figure 1 is a side elevation of a spring wheel which is constructed in accordance with these principles, but with a covering portion removed to exhibit internal construction. Fig. 2 is a section on the section line 2—2 of Fig. 1, but with the peripheral tread slightly modified in form to prevent skidding. Fig. 3 is a section on line 3—3 of Fig. 1.

In the illustrated specimen of my invention, the hub, the spokes, the inner rim, or felly, and the channeled outer rim, of the wheel, are denoted respectively by the numerals 1, 2, 3 and 4; while the tread, formed preferably of rubber and held by the outer rim, is denoted in Figs. 1 and 3 by the numeral 5, and in Fig. 2 by the numeral 5'. The inner rim is peripherally encircled by the annular overlapping channeled plate or felly band, 6, which is securely seated thereon and comprises the duplicate and parallel marginal flanges 7 and 7; while the outer rim is lined with a metallic strip or band 8, which is narrower than the rim and securely seated therein. The resilient members which constitute the nucleus of the invention are located between these concentric members 6 and 8, and are attached thereto. A plurality of half-elliptic or bent-leaf springs 9, disposed lengthwise of the plate 6 and uniformly spaced apart, are secured thereto by the rivets 10 at the middle of each spring; while an equal number of similar springs, 11, uniformly spaced apart, and disposed lengthwise of the lining 8, are secured thereto by the central rivets 12 at points angularly midway between the nearest springs 9. Each spring 9 has at each end a pivoted or hinged plate 13 linking the spring to a radially opposite bracket 14 on the outer rim lining 8; and each spring 11 has likewise a hinged or pivoted plate 15 linking each end of the spring to the radially opposite bracket 16 in the channel of the plate 6. On each of the hinge-pins 17, which pivotally connect the described springs 9 and 11 with the link plates 13 and 15 respectively, is likewise pivoted a stud 18, holding an end of the spiral spring 19, which operates under variable compression between the adjacent springs 9 and 11. To exclude sand, water, etc. from the springs, the annular plates 20, fitted to the rim 4 and in sliding contact with the gaskets 21 on the flanges 7 of the rim plate 6 are clamped snugly to the opposite sides of the wheel by the bolts 22.

Operatively the inner and the outer rim are maintained in a concentric position of equilibrium by the initial compression of the springs. Whenever that position is changed, this initial compression is disturbed throughout the entire chain of connected springs 9 and 11; these, therefore, resist the displacement and expend elastic energy in the effort to return the rims to their normal position and to restore their equilibrium. Whenever in the running of the wheel the concentric relation of the rims is disturbed diametrically opposite leaf springs between them are affected contrarily, one by an increase of elastic energy and the other by a diminution, or by a diminution and reversal of direction, of such energy. Accordingly, if the displacement is considerable, such opposite springs coöperate, one to push and the other to pull, the displaced rim back to its normal concentric position. At the same time the operative deformation of any individual leaf spring by unbending toward straightness, exerts compression upon the adjacent spiral springs and thus distributes the force of the rim displacement more or less extensively in the entire circuit of springs, according to the magnitude of force.

I claim as my invention—

A spring wheel comprising two normally concentric rims, a plurality of half-elliptic springs severally and centrally fastened to the inner ring and terminally linked to the outer rim, an equal number of intermediate half-elliptic springs similarly fastened to the outer rim and linked to the inner rim, and resilient interconnections between the adjacent leaf springs.

Witness my signature at Omaha, Nebraska, June 12, 1919.

LOWELL V. LANDGREEN.